United States Patent [19]

Léichlé

[11] 4,127,091
[45] Nov. 28, 1978

[54] INTERNAL COMBUSTION ENGINE IGNITION ELECTRONIC CONTROL DEVICE AND METHOD

[75] Inventor: Claude Léichlé, Boulogne-Billancourt, France

[73] Assignee: Regie Nationale des Usines Renault, Boulogne-Billancourt, France

[21] Appl. No.: 730,320

[22] Filed: Oct. 7, 1976

[30] Foreign Application Priority Data

Oct. 9, 1975 [FR] France .................................. 75 30902
Apr. 20, 1976 [FR] France .................................. 76 11524

[51] Int. Cl.$^2$ ............................ F02P 5/04; G06F 7/38
[52] U.S. Cl. ............................... 123/117 D; 123/148 E; 235/92 CT; 123/117 R
[58] Field of Search ........... 123/117 D, 148 E, 117 R; 235/92 CT, 92 T

[56] References Cited

U.S. PATENT DOCUMENTS

| | | | |
|---|---|---|---|
| 3,780,711 | 12/1973 | Lindberg | 123/117 D |
| 3,853,103 | 12/1974 | Wahl et al. | 123/117 D |
| 3,898,894 | 8/1975 | Aono et al. | 123/117 D |
| 3,903,857 | 9/1975 | Hönig et al. | 123/117 R |
| 3,908,616 | 9/1975 | Sasayama | 123/117 D |
| 3,927,648 | 12/1975 | Kawai et al. | 123/117 D |
| 4,009,699 | 3/1977 | Hetzler et al. | 123/117 D |
| 4,015,565 | 4/1977 | Aono et al. | 123/117 D |

Primary Examiner—Charles J. Myhre
Assistant Examiner—R. A. Nelli
Attorney, Agent, or Firm—Fleit & Jacobson

[57] ABSTRACT

Device for electronically controlling the ignition of an internal combustion engine comprising a sequencer coupled through a first output to one input of a first binary rate multiplier coupled in turn through a series of parallel-connected inputs to a pressure sensor-converter, the output of said multiplier being connected to one input of another binary rate multiplier connected through a series of parallel-connected inputs to a memory coupled in turn via a set of parallel-connected inputs to a counter connected to the sensor associated with the engine-driven member.

10 Claims, 7 Drawing Figures

INTERNAL COMBUSTION ENGINE IGNITION ELECTRONIC CONTROL DEVICE AND METHOD

This invention relates to improved methods of and means for electronically controlling the ignition system of an internal combustion engine, notably for motor vehicles.

The control of the ignition system of an internal combustion engine implies the possibility of generating ignition pulses shifted in relation to the top dead center by a quantity that must necessarily be properly calculated and which is independent of the engine rotational cycle.

Various solutions, all more or less complicated, have already been proposed for this problem, but so far none of them was fully satisfactory. Some solutions are complex and others require very delicate and fine adjustments at the expense of reliability, and furthermore they are scarcely capable of giving a sufficient reproducibility of the proper setting.

This invention provides improved method and means for avoiding the inconveniences set forth hereinabove.

According to this invention, the electronic ignition advance control method contemplated consists in delivering for each ignition phase a control signal for actuating the power member (i.e., the ignition coil, typically) of an electronic ignition circuit of the type comprising a digital computer capable of calculating the ignition advance angle A for each half-revolution of the crankshaft in the case of a four-stroke, four-cylindered engine as a function of three parameters: the absolute pressure $P_a$ in the induction manifold, the velocity of rotation $\omega$ of the engine and the temperature T of the cooling fluid, by means of sensors disposed at suitable locations on the engine, this method being characterised in that for each half-revolution of the engine crankshaft, the digital computer will calculate the angle:

$$A_V = A_M - A_o(\omega) + \delta_1 \cdot (P - P_o) \cdot a(\omega) - \delta_2 A_t.$$

In this equation:

$A_M$ is the minimum ignition advance angle, $A_o(\omega)$ is a constant readable in the memory of the computer as a function of the rotational velocity, $\delta_1$ is a constant having zero value when the pressure P in the induction manifold is lower than a fixed value $P_o$ depending on the engine type involved, and a value one when $P > P_o$, $a(\omega)$ is a quantity readable in the memory of the computer as a function of the rotational velocity $\omega$, $\delta_2$ is a constant having zero value when the temperature T of the cooling fluid exceeds a predetermined value $T_o$ and a value one when $T < T_o$, and $A_t$ is a constant.

According to the method of this invention, the ignition spark is released beyond an angle $A_M$ of maximum advance by deducting an angle $A_V$ from the signal corresponding to the aforesaid angle $A_M$.

The method of this invention is further characterised in that it utilizes a first sensor delivering a pulse each time the starter-motor driven gear ring or flywheel has moved through $d\,a$ degrees, and a second sensor delivering a pulse corresponding to the maximum value $A_M$ of the ignition advance angle, and that this advance angle is expressed as a number of half-teeth of the starter gear ring, i.e. $d\,a$.

According to this invention, the electronic ignition control device for carrying out the above-disclosed ignition method comprises essentially: a plurality of sensors disposed at fixed angular positions around the engine-driven rotary member and adapted to co-act with reference means carried by said member; a pressure sensor mounted in the engine induction manifold and an engine cooling fluid temperature sensor; a digital computer incorporating binary rate multipliers: an up-and-down counter; a read only memory (ROM) in which the coefficients $A_M - A_o(\omega)$ and $a(\omega)$ are written unalterably as a function of the engine velocity $\omega$, and a sequencer associated with a clock.

According to a specific feature characterising the method of the present invention, it is contemplated to synchronize the time base $t_1$ for counting the number of half-teeth of the starter gear ring which move past the velocity sensor with a rising wavefront of velocity signal V. Thus, a cause of error is avoided.

As the coefficient $a(\omega)$ is stored in the read only memory of the device, its sign is immutable and cannot be modified to vary as a function of speed. Now certain engines are liable to take advantage of this facility.

According to a modified embodiment of this invention, it is contemplated to incorporate in the read only memory a bit or binary quantity corresponding to the sign of said quantity $a(\omega)$.

Thus, the word corresponding to $a(\omega)$ comprises an additional, so-called "sign bit" binary quantity equal to "one" when $a(\omega)$ is positive, and to "zero" when said value is negative. Moreover, the device is modified by adding a complex gate inserted between the divider by M and the up-and-down counter, this modification permitting a proper exploitation of the word representing the quantity $a(\omega)$.

Other features and advantages of this invention will appear as the following description proceeds with reference to the attached drawings illustrating diagrammatically, by way of example, various forms of embodiment of the invention.

In the drawings.

In the various Figures of the drawings, the same reference numerals designate the same component elements.

In the following disclosure, the case of a four-stroke, four cylindered engine is contemplated. It is of course within the skill of anybody conversant with the art to adapt this disclosure to the case of any other engine, the generality of the description remaining unchanged notwithstanding the reference to a specific engine type.

Figure 1:
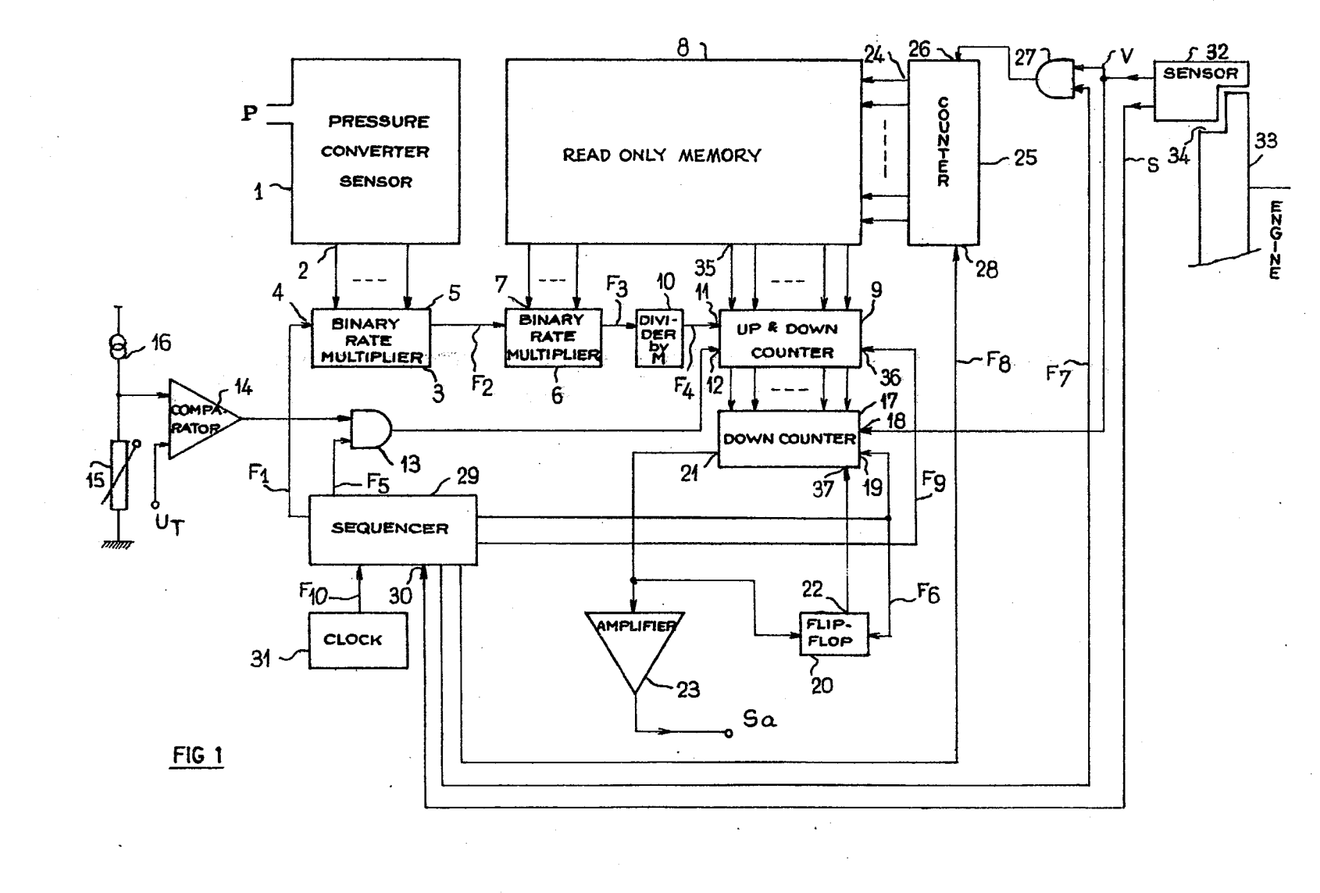
FIG. 1 is a block diagram showing an electronic control device for the ignition system of an internal combustion engine, constituting an application of the ignition advance system of this invention.

Referring first to the form of embodiment shown in FIG. 1, a pressure converter sensor 1 assumedly of known construction provides at its outputs 2 a number proportional to the quantity $\delta_1 (P - P_o)$. This sensor is so disposed as to detect the pressure prevailing in the air induction manifold of the internal combustion engine. $P_o$ is a fixed value depending on the type of engine involved, and $\delta_1$ is a constant having zero value when the pressure P in the manifold is lower than $P_o$ and a value one when the pressure P exceeds $P_o$. This number $\delta_1 (P - P_o)$ is fed to the corresponding inputs of a binary rate multiplier 3. This multiplier 3 having a maximum capacity $N_1$ receives a signal $F_1$ at its input 4 from a sequencer 29 and delivers at its output 5 a signal $F_2$ fed directly to another binary rate multiplier 6 having a maximum capacity $N_2$. This second binary rate multiplier 6 receives, on the other hand, at its inputs 7 a number proportional to the term $\alpha (\omega)$ from the read only memory 8. This read only memory 8 also supplies the predetermination inputs 35 of an up-and-down counter 9 with a number proportional to $A_M - A_o (\omega)$. The output of this second binary rate multiplier 6 is coupled to the up-and-down counter 9 via a divider by M 10 delivering a signal $F_4$ to the counting input 11 of the up-and-down counter 9. The down-counting input 12 of this up-and-down counter 9 receives a signal $F_5$ from said sequencer 29 via an AND gate 13 connected in turn through its second input to the output of a comparator 14 comparing a voltage across the terminals of a thermistance 15 fed from a constant-current generator 16, and a reference voltage $U_T$. Another predetermination input 36 of said up-and-down counter 9 is connected to the sequencer 29 from which it receives a signal $F_9$. The up-and-down counter 9 supplies through its outputs a down-counter 17 receiving in turn at its clock input 18 a signal V of which the origin will be explained presently, and at its charging input 19 a signal $F_6$ from the sequencer 29, this signal being also fed to one input of a monostable flip-flop or multivibrator 20. The output 21 of the down-counter 17 is coupled to another input of said monostable flip-flop or multivibrator 20 having its output 22 connected to the blocking input 37 of down-counter 17. The signal produced at the output 21 of down-counter 17, after its passage through an amplifier 23, constitutes the signal obtained at the output $S_a$ of the computer. The addressing inputs 24 of memory 8 are coupled to the outputs of a counter 25 receiving at its counting input 26 the signal V having passed through an AND gate 27 receiving at its second input a signal $F_7$ from said sequencer 29. The resetting input 28 of counter 25 is also coupled to the sequencer 29 so as to receive therefrom a signal $F_8$. The complete device is controlled during its operation by the signals $F_1$, $F_5$, $F_6$, $F_7$, $F_8$ and $F_9$ generated by the sequencer 29 from a signal S fed to its input 30 and another signal $F_{10}$ emitted by a clock 31 of which the function will be explained presently.

A sensor 32 disposed in front of the starter-motor driven gear ring 33 of the internal combustion engine generates, on the one hand, a signal V corresponding to the half-teeth of said gear ring and, on the other hand, a signal S as mentioned in the foregoing, by virtue of slots formed on the flywheel portion 34. This sensor is assumed to incorporte the electronic means necessary for shaping the corresponding signals.

This device operates as follows: the signal S generated by sensor 32 as a consequence of the passage of a slot on the flywheel portion 34 past the sensor is transmitted to the input 30 of sequencer 29, thus starting the down-counting of the advance whereby, between two successive signals S, the advance angle and the down-counting of the corresponding digital value can take place. This time period corresponds therefore to a complete cycle of the computer and only this time period will be discussed hereinafter. The signal S is generated by a slot located on the flywheel portion 34 corresponding to the passage of the point of maximum ignition advance. The ignition of the air/fuel mixture for the next cycle cannot take place before said point moves past.

Figure 2:
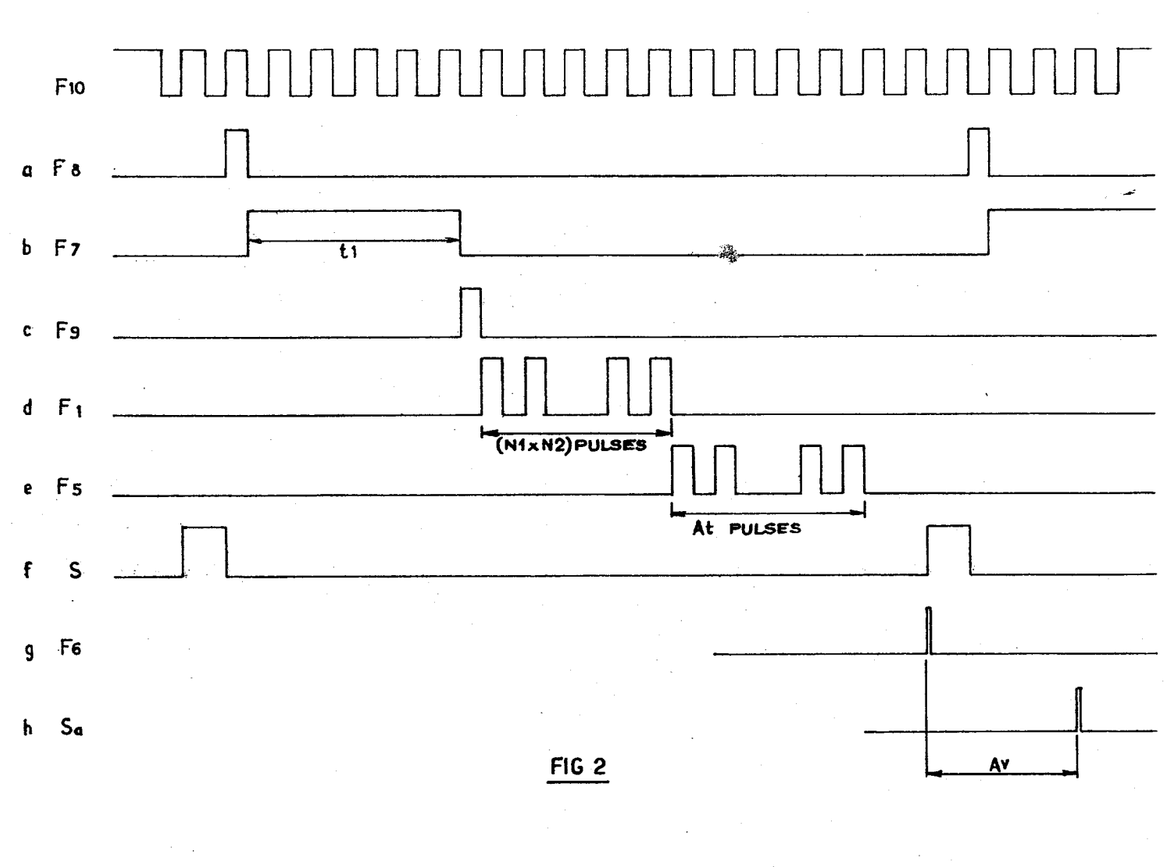
FIG. 2 illustrates the waveform of signals at different points of the device of FIG. 1.

Reference will now be made to FIG. 2 illustrating the timing diagram of the various signals reduced to a time scale designated by the clock signal $F_{10}$. Thus, signal $F_8$ (FIG. 2a) is a resetting pulse fed to counter 25 from the vary beginning of the cycle. Then the signal $F_7$ (FIG. 2b) causes the AND gate 27 to open, thus causing the pulses of signal V to drive the counter 25 during a fixed time $t_1$. At the end of this time $t_1$, the counter 25 displays at its outputs 24 a number proportional to the engine rotational velocity which is fed directly to the dead memory 8 via its address inputs. Thus, the corresponding numbers $\alpha (\omega)$ and $A_M - A_o (\omega)$ are present at the output 7 and 35 of said dead memory.

The pressure sensor-converter 1 has at one of its outputs a number P proportional to $\delta_1 (P - P_o)$.

The up-and-down counter 9 receives at its predetermination input 36 the signal $F_9$ (FIG. 2c) inserting the number $A_M - A_o (\omega)$ in said up-and-down counter. Then the signal $F_1$ (FIG. 2d) is fed to the first binary rate multiplier 3. This signal consists of $N_1 \cdot N_2$ pulses, wherein $N_1$ and $N_2$ are the maximum capacities of the two binary rate multipliers 3 and 6, respectively.

The signal $F_2$ at the output of the first binary rate multiplier 3 then comprises:

$$N_1 \cdot N_2 \cdot \frac{\delta_1 (P - P_o)}{N_1} \text{ pulses,}$$

The signal $F_3$ at the output of the second binary rate multiplier 6 comprises:

$$N_1 \cdot N_2 \cdot \frac{\delta_1 (P - P_o)}{N_1} \cdot \frac{\alpha (\omega)}{N_2} \text{ pulses}$$

Finally, the signal $F_4$ from divider by M 10 and fed to the counting input 11 of the up-and-down counter 9 contains a number of pulses equal to:

$$\frac{\delta_1 (P - P_o) \cdot \alpha (\omega)}{M}$$

The value of M is determined with a view to impart the necessary homogeneity to the two expressions $o_1 (P - P_o)$, $\alpha (\omega)$ and $A_M - A_o (\omega)$ (scale factor).

Upon completion of the generation of the pulses of signal $F_1$, the sequencer 29 generates another signal $F_5$ (FIG. 2e) comprising $A_f$ pulses. $A_f$ designates a constant calculated to take due account of the influence of the engine cooling fluid temperature. According to the value of thermistance 15, and therefore of temperature T, the voltage across its terminals is higher or lower than the reference voltage $U_T$, corresponding to the release temperature $T_o$. In the hypothesis $T < T_o$, the output signal of comparator 14 is equal to one and causes the AND gate 13 to open, that is, the passage of pulses $F_5$ from sequencer 29 to the down-counting input 12 of the up-and-down counter 9.

In the other alternative, i.e. with $T > T_o$, the pulses $F_5$ are blocked by gate 13. Thus, the function $\delta_2 A_t$ is obtained.

At the end of the sequence, the number contained in the up-and-down counter 9 is equal to:

$$A_V = A_M - A_o(\omega) + \delta_1(P_1 - P_o) \cdot \alpha(\omega) - {}_2A_t$$

it being understood that the units are homogeneous, thus accounting for the disappearing of number M. The object in view is thus achieved and the result of the above calculus is available at the output of the up-and-down counter 9.

The generation of signal S controlling the beginning of the down-counting of the advance angle is attended by the generation of signal $F_6$ (FIG. 2g) charging the result available at the outputs of the up-and-down counter 9 into the down-counter 17 and sets the output of flip-flop 20 in its one state. Each pulse of signal V, i.e. each half-tooth of the starter-motor driven gear ring 33, is attended by a decrement of down-counter 17 which, when at zero value, delivers a pulse at its output 21. This pulse is amplified in amplifier 23 and has the appearance illustrated in FIG. 2h; it releases the ignition power device connected to the output terminal $S_a$, thus producing the ignition spark. The same output signal at 21 restores the flip-flop 20 so as to block the down-counter 19 by means of its blocking input 37 until another signal S is generated.

The number of pulses available between signals S and $S_a$, which is equal to $A_v$, is limited by the down-counter 17. In case of misadjustment, the advance angle will lie between $A_M$, i.e. the maximum advance value corresponding to the number 000 in down-counter 17, and an angle $A_m$ corresponding to the same down-counter 17 charged at its maximum capacity. If this maximum capacity is so selected that the angle $A_m$ actually constitutes the minimum permissible advance angle, the device cannot generate a spark outside the area of permissible advance, thus permitting the operation of the system even in case of failure of one of the calculus elements.

Now some information concerning the construction of the various component elements will be given.

The clock 31 is of simple construction due to the use of elementary components or specific circuits. In fact, it consists of a fixed-frequency oscillator delivering square signals.

As clearly apparent from FIG. 2, the sequencer 29 generates three types of signals.

Signals of type $F_9$ (FIG. 2c), consisting of a clock pulse $F_{10}$ having a fixed position in time in relation to the signal S. This pulse may be generated by means of a counter having its outputs connected to the inputs of a decoder having several outputs each providing the picture of a clock pulse. In fact, each decoder output generates a clock pulse when the counter is in a position determined by the rank of the decoder output. Thus, when the counter resetting input is fed with signal S, the position of each signal at the decoder output is well-defined. Therefore, it is only necessary to locate this position on the time diagram of FIG. 2 and select the corresponding decoder output.

Signals of type $F_7$ (FIG. 2b); these signals consist of a pulse beginning at a well-defined moment in relation to signal V and lasting a time $t_1$ corresponding to X successive clock pulses. This pulse may be generated by a simple flip-flop or monostable univibrator receiving at its input the starting pulse and reset by the application to its corresponding input of an end pulse. Thus, the signal generated by the output of said flip-flop actually corresponds to the desired signal.

Signals of type $F_1$ (FIG. 2d corresponding to a train of Y clock pulses, also beginning at a well-defined moment in relation to signal S. This train of pulses may be generated by a flip-flop followed by an AND gate having a first input coupled to the output of the flip-flop of monostable multivibrator and another input coupled to the clock output. The flip-flop generates a square signal of the $F_9$ type, which, when fed to the second input of an AND gate, causes this gate to permit the passage of the clock pulse $F_{10}$ during the time period in which said flip-flop is in its one state. Therefore, the output of the AND gate will actually generate the desired signal.

Figure 3:
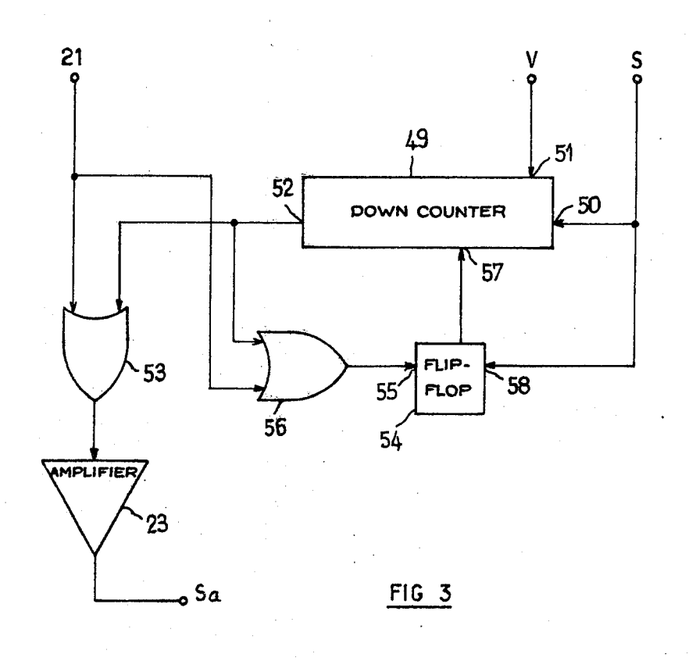
FIG. 3 is a safety device adapted to be incorporated in the ignition electronic control device of FIG. 1.

A system of the type illustrated in FIG. 3 may be contemplated for creating a redundancy in the circuit of FIG. 2 between the output 21 of down-counter 17 and the amplifier 23, in order to preserve the engine ignition irrespective of the momentary condition of the computer.

Referring more particularly to FIG. 3, this arrangement comprises a down-counter 49 preset by construction to a value corresponding to the minimum ignition advance angle. The predetermination input 50 of this down-counter 49 is connected for receiving the signal S and its clock input 51 receives the signal V. Its output 52 is coupled like the output 21 of down-counter 17 to the amplifier 23 via an OR gate 53. A flip-flop 54 is started by said signal S fed to its input 58 and receives at its resetting input 55 either the signal from the output 52 of down-counter 17, or the signal from the output 52 of down-counter 29 via another OR gate 56. The output of flip-flop 54 is coupled to the blocking input 57 of down-counter 49.

The operation of this safety device will now be described in detail.

Both down-counters 17 and 49 are started simultaneously and decremented in the same manner. When a signal appears at the output 21 of down-counter 17, it triggers the amplifier 23 and causes an ignition spark to be generated. It also resets the flip-flop 54 previously started by signal S. The other down-counter 49 is thus blocked and ready to operate in response to the next signal.

If as a consequence of a computer failure, the signal does not appear at the output 21 of down-counter 17 though the minimum advance angle is attained, a signal appears at the output 52 of the auxiliary down-counter 49 and releases via OR gate 53 the spark for operating the engine. The same signal resets the flip-flop 54, thus blocking the down-counter 49 until the next pulse S is produced. Considering the case of a four-stroke, four-cylindered engine, a pulse S is delivered every half-revolution of the engine crankshaft.

As shown in FIG. 1, the number $\alpha(\omega)$ proportional to the engine rotational velocity $\omega$ and written in the read only memory 8 is fed by the inputs 7 to the binary rate multiplier 6 and the number of pulses of the signal $F_3$ obtained at the output of this multiplier 6 is equal to the product of $F_2$ (input signal $\alpha$ of multiplier 6) by $\alpha(\omega)$. Thus, whatever the sign of $(\omega)$, only the absolute value can be taken into account since it is precluded to have a signal consisting of a negative number of pulses. The signal $F_3$, after having been divided by M in divider 10, is fed to the input 11 of the up-and-down counter 9 which constitutes its counting input.

Figure 4:
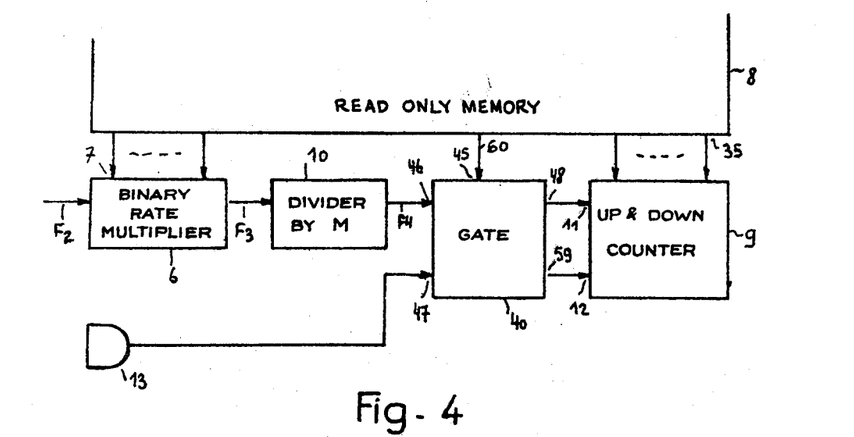
FIG. 4 illustrates diagrammatically a first modified form of embodiment of the device of FIG. 1.
Figure 5:
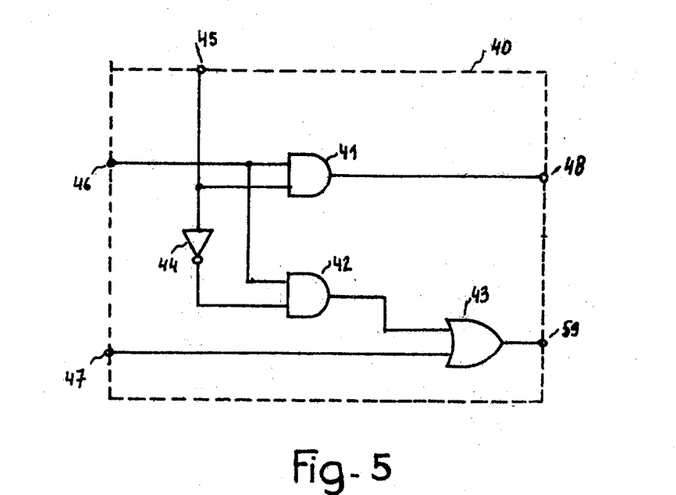
FIG. 5 illustrates a typical form of embodiment of the complex gate incorporated in the modified structure shown in FIG. 4.

In the modified structure illustrated in FIG. 4, a complex gate 40 constructed as illustrated in FIG. 5 is inserted between the output F₄ of the divider 10 by M and the positive and negative counting inputs 11 and 12 respectively of the up-and-down counter 9.

Consequently, the number $\alpha(\omega)$ writted in the dead memory 8 comprises two portions: on the one hand the absolute value fed to the inputs 7 of multiplier 6, and on the other hand the sign bit fed via a conductor 60 to the input 45 of the additional gate 40. This gate 40 also receives at its input 46 the signal F₄ and at its input 47 the signal released from gate 13 which is responsive to the cooling fluid temperature. Both outputs 48 and 59 of gate 40 are fed to the positive and negative counting inputs 11 and 12, respectively, of up-and-down counter 9.

FIG. 5 illustrates the details of gate 40. It will be seen that the input 46 is connected to the inputs of a pair of AND gates 41 and 42, which receive the signal fed to 45 or the reverse thereof via an inverter 44 to their second inputs. The output of gate 41 corresponds directly to output 48, and the output of gate 42 is fed like input 47 to the OR gate 43 of which the output corresponds to output 59.

This assembly operates as follows:

When the sign bit of $\alpha(\omega)$ available at 60, i.e. at the output of the dead memory 8, is equal to one, the signal F₄ can pass through the gate 41 and be fed to the input 11 of counter 9, and the signal from gate 13 is fed to the input 12 of counter 9. Therefore, this mode of operation is similar to that of the device shown in FIGS. 1–3, for as the sign bit is equal to one, $\alpha(\omega)$ is positive.

In the other alternative, no signal is fed to the counting input 11, since gate 41 is blocked. On the other hand, signal F₄ is diverted by gate 42 towards the OR gate 43 and the output 59 generates the set of signals F₄ and those issuing from gate 13, all of which being fed to the down-counting input 12. The treatment of the temperature signal remains unchanged, but F₄ is diverted towards the other input of the up-and-down counter, thus reversing its sign.

Regarding the synchronisation of the time base $t_1$ for measuring the velocity value with ascending wavefront of the velocity signal V, when this arrangement is completed, the number of counted pulses must remain constantly the same, with V fixed, a condition not obtainable without synchronisation.

Figure 6:
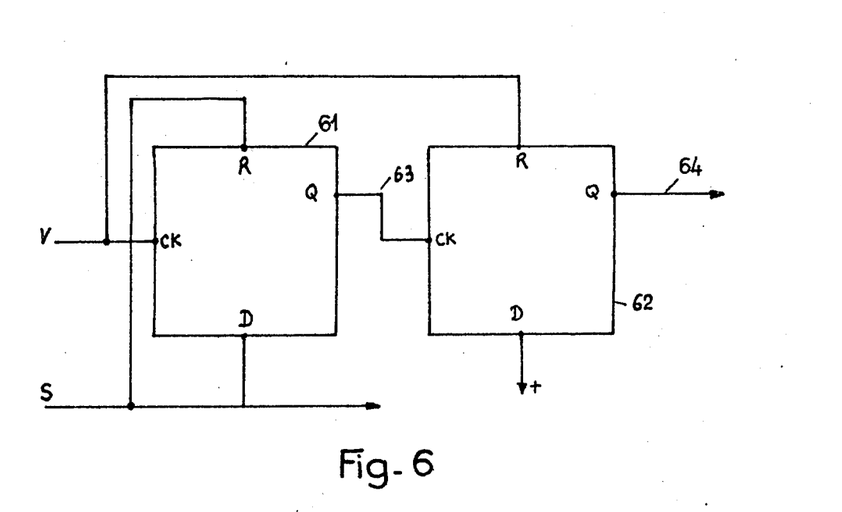
FIG. 6 illustrates diagrammatically a second modification brought to the device of FIG. 4.

FIG. 6 illustrates an exemplary arrangement for obtaining this result by interposing a pair of identical D-type multivibrators 61 and 62. The signal V from sensor 32 is fed to the clock input CK of flip-flop 61 and to the resetting R of flip-flop 62. The signal S also received from sensor 32 is coupled to input D and resetting input R of flip-flop 61. The output Q of flip-flop 61 is coupled to the clock input CK of flip-flop 62 via a conductor 63, and the input D of flip-flop 62 is set at a voltage corresponding to value one. The output Q of flip-flop 62 is coupled via a conductor 64 to the AND gate 27 illustrated in FIG. 1, and delivers a pulse for resetting the counter 25 of FIG. 1 in synchronism with V.

Figure 7:
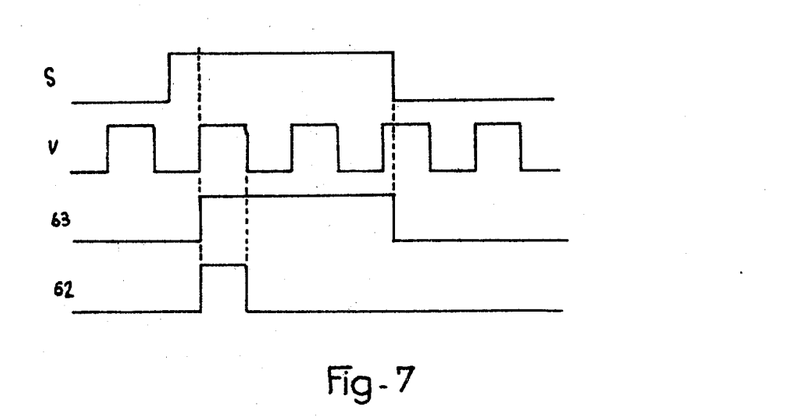
FIG. 7 is a signal diagram for explaining the mode of operation of the arrangement shown in FIG. 6.

Referring to the time diagram of FIG. 7, the above-described device operates as follows: When the signal S assumes the value one, the flip-flop 61 can tilt, provided that the signal V has an ascending wavefront. The signal carried by conductor 63 then assumes the value one until the resetting signal S drops again. The signal carried by conductor 63 is coupled to the clock input of the second flip-flop 62, and the latter is reset when signal V resumes its zero value. This accounts for the specific shape of the output signal carried by conductor 64 which corresponds to a pulse of signal V, the first pulse after the release of signal S. This shape is in fact the one necessary for properly synchronising the set of control signals of the ignition electronic control device and notably the time signal $t_1$ for determining the velocity and thus permitting a fixed value at the output of counter 25, if the representative frequency value is fixed.

What is claimed as new is:

1. In a device for electronically controlling the ignition of an internal combustion engine, by delivering at the proper time a control signal for actuating the power member of an electronic ignition circuit of the type comprising at least one sensor disposed at fixed angular positions around an engine-driven rotary member and co-acting with reference means carried by said rotary member; a sensor for detecting the momentary pressure in the engine induction manifold and another sensor for detecting the temperature of the engine cooling fluid; a digital computer associated with a read only memory containing coefficients necessary for calculating the ignition advance angle A for each half-revolution of the crankshaft written as a function of the absolute pressure $P_a$ in the induction manifold, the engine rotational velocity $\omega$ and the engine cooling fluid temperature T, said digital computer being arranged to calculate for each engine half-revolution the angle:

$$A_V = A_M A_o(\omega) + \delta_1(P - P_o) \cdot \alpha(\omega) - \delta_2 A_t$$

wherein:
  $A_M$ is the minimum ignition advance angle,
  $A_o(\omega)$ is a constant which is a function of the rotational velocity,
  $\delta_1$ is a binary constant being zero when the pressure P in the induction manifold is lower than a fixed value $P_o$ and being one when $P > P_o$,
  $\alpha(\omega)$ is a quantity which is a function of the engine rotational velocity $\omega$,
  $\delta_2$ is a constant having zero value when the temperature T of the cooling fluid exceeds a predetermined value $T_o$ and a value one when $T < T_o$, and
  $A_t$ is a constant;

the electronic circuit further comprising a clock connected to drive a sequencer, wherein the improvement comprises a first binary rate multiplier connected to receive a first output of said sequencer and a plurality of parallel-connected outputs from a pressure sensor-converter; a second binary rate multiplier connected to receive the output of said first binary rate multiplier and a plurality of parallel-connected outputs from said read only memory, the output of said second binary rate multiplier being fed to a divider for dividing the input by a constant M and producing an output therefrom, said read only memory connected to receive a set of parallel-connected inputs from a counter connected to the sensor associated with the engine-driven rotary member; an up-and-down counter connected to receive the output from said dividers, a plurality of parallel-connected inputs from said read only memory, and another input from the temperature sensor which has been gated with an output signal from said sequencer, whereby the results of the calculation are available at the outputs of said up-and-down counter, and represent said power member control signal.

2. Ignition electronic control device according to claim 1, wherein the ignition spark is produced after the down-counting of the angle $A_V$ from the signal corresponding to the angle $A_M$, and whereby angle $A_M$ is measured by means of a unit linked to the starter-motor driven gear ring of the engine.

3. Ignition electronic control device according to claim 1, wherein said at least one sensor disposed around said engine-driven rotary member comprises: a first sensor for delivering a pulse every $d\alpha$ degrees on said starter-motor driven gear ring, and a second delivering a pulse corresponding to the maximum value $A_M$ of the advance angle, this advance being expressed in terms of half-teeth of said gear ring, i.e., in $d\alpha$.

4. Ignition electronic control device according to claim 1, wherein the outputs of said up-and-down counter are connected in parallel to the inputs of a first down-counter connected via a first other input to said at least one sensor disposed around said engine-driven rotary member, via a second other input to a first flip-flop, via a third other input to said sequencer, said first flip-flop being connected to said sequencer and to the output of said first down-counter, and the output of said computer from said first down-counter being fed to an amplifier for triggering a spark generator of the engine.

5. Ignition electronic control device according to claim 4, wherein the up-and-down counter associated with the read only memory is coupled to the temperature sensor and to the sensor associated with the engine driven rotary member, respectively, by means of AND gates each of said AND gates being connected via a second input to said sequencer and wherein said sequencer is connected via a first input to the clock and via a second input to said sensor associated with the engine-driven rotary member.

6. Ignition electronic control device according to claim 4, comprising a second down-counter connected in parallel via a first input to the corresponding input of the first down-counter, via a second input to the output of a second flip-flop, via a third input in parallel to said second flip-flop and in parallel to the second input of said sequencer which is connected to said sensor associated with the engine-driven rotary member, the output of said second down-counter being connected to a first input of a first OR gate interposed between the output of the first down-counter and the amplifier, and to the first input of a second OR gate connected via its second input to the output of the first down-counter and through its output to a second input of said second flip-flop.

7. Method of calculating the ignition advance angle of an internal combustion engine, notably for motor vehicles, wherein the time base $t_1$ for measuring the rotational velocity of the engine is synchronised with an ascending wavefront of the velocity signal V.

8. Ignition electronic control device according to claim 6, wherein two D-type flip-flops are inserted between said angular position sensor and an AND gate controlling the clock input of the counter, the V signal from said sensor being coupled to the clock input of the first flip-flop and to the resetting input of the second flip-flop, the signal S from said sensor being coupled to the resetting input R and to the input D of the first flip-flop, the output Q of the first flip-flop being connected to the clock input of said second flip-flop.

9. Ignition electronic control device according to claim 4, further comprising a complex gate means inserted between the output of said divider by M and the inputs of said up-and-down counter, said complex gate connected via a first input to the divider by M, via a second input to the read only memory for receiving the sign corresponding to the quantity $\alpha(\omega)$ and via a third input to the temperature sensor.

10. Ignition electronic control device according to claim 9, wherein the complex gate comprises two AND gates and one OR gate, said pair of AND gates being connected at one of their inputs to the output of said divider by M and at their second input to one output of said read only memory, and of said AND gates being connected to said read only memory by means of an inverter; the output of the first AND gate being connected to the counting input of said up-and-down counter while the output of the second AND gate is connected to the down-counting input of said up-and-down counter via said OR gate connected in turn via its second input to said temperature sensor.

* * * * *